US011534737B2

(12) United States Patent
Nihashi (10) Patent No.: US 11,534,737 B2
(45) Date of Patent: Dec. 27, 2022

(54) EXHAUST GAS PURIFICATION CATALYST (71) Applicant: CATALER CORPORATION, Kakegawa (JP)

(72) Inventor: Hiroki Nihashi, Kakegawa (JP)

(73) Assignee: CATALER CORPORATION, Kakegawa (JP)

( * ) Notice: Subject to any disclaimer, the term of this patent is extended or adjusted under 35 U.S.C. 154(b) by 162 days.

(21) Appl. No.: 16/965,806

(22) PCT Filed: Jan. 16, 2019

(86) PCT No.: PCT/JP2019/001132
§ 371 (c)(1),
(2) Date: Jul. 29, 2020

(87) PCT Pub. No.: WO2019/159586
PCT Pub. Date: Aug. 22, 2019

(65) Prior Publication Data
US 2021/0046457 A1   Feb. 18, 2021

(30) Foreign Application Priority Data
Feb. 15, 2018   (JP) .............................. JP2018-025308

(51) Int. Cl.
| *B01J 23/46* | (2006.01) |
| *B01J 21/04* | (2006.01) |
| *B01J 35/02* | (2006.01) |
| *B01J 35/00* | (2006.01) |
| *B01J 37/02* | (2006.01) |
| *B01J 37/08* | (2006.01) |
| *B01D 53/94* | (2006.01) |
| *F01N 3/28*  | (2006.01) |

(52) U.S. Cl.
CPC ............ *B01J 23/464* (2013.01); *B01D 53/94* (2013.01); *B01J 21/04* (2013.01); *B01J 35/0013* (2013.01); *B01J 35/026* (2013.01); *B01J 37/0219* (2013.01); *B01J 37/0221* (2013.01); *B01J 37/086* (2013.01); *F01N 3/2803* (2013.01); *B01D 2255/1023* (2013.01); *B01D 2255/1025* (2013.01); *F01N 2330/02* (2013.01); *F01N 2370/02* (2013.01); *F01N 2510/06* (2013.01)

(58) Field of Classification Search
CPC ...... B01J 23/464; B01J 21/04; B01J 35/0013; B01J 35/026; B01J 37/0219; B01J 37/0221; B01J 37/086; B01D 53/94; F01N 3/2803
See application file for complete search history.

(56) References Cited

U.S. PATENT DOCUMENTS

| 3,998,759 A | 12/1976 | Hoekstra |
| 2005/0153836 A1* | 7/2005 | Matsuo ................ B01D 53/945 502/328 |
| 2019/0099715 A1 | 4/2019 | Sakurada et al. |

FOREIGN PATENT DOCUMENTS

| DE | 26 52 921 B1 | 7/1977 | |
| DE | 2652921 B1 * | 7/1977 | .............. B01J 37/02 |
| JP | S53-68691 A | 6/1978 | |
| JP | S57-147439 A | 9/1982 | |
| JP | S63-302949 A | 12/1988 | |
| JP | H09-108570 A | 4/1997 | |
| JP | 2005-199122 A | 7/2005 | |
| JP | 2006-192365 A | 7/2006 | |
| JP | 2009-078203 A | 4/2009 | |
| JP | 2017-100073 A | 6/2017 | |
| WO | 2017/163916 A1 | 9/2017 | |

OTHER PUBLICATIONS

Apr. 16, 2019 International Search Report issued in International Patent Application No. PCT/JP2019/001132.
Apr. 16, 2019 Written Opinion issued in International Patent Application No. PCT/JP2019/001132.
May 25, 2021 extended Search Report issued in European Patent Application No. 19754724.3.
Aug. 22, 2022 Office Action issued in Chinese Application No. 201980012742.7.

* cited by examiner

*Primary Examiner* — Yong L Chu
(74) *Attorney, Agent, or Firm* — Oliff PLC (57) ABSTRACT

An exhaust gas purification catalyst including particles of a catalyst metal supported on secondary particles of an inorganic oxide, wherein when scanning transmission electron microscope-energy dispersive X-ray line analysis is performed from a surface of the secondary particles toward a center thereof, a support density of the catalyst metal on a surface side of the secondary particles is greater than the support density of the catalyst metal in a center part of the secondary particles.

18 Claims, 4 Drawing Sheets

EXHAUST GAS PURIFICATION CATALYST

FIELD

The present invention relates to an exhaust gas purification catalyst.

BACKGROUND

Support catalysts in which fine particles of a catalyst metal are supported on carrier particles are used as the catalyst used in exhaust gas purification. In particular, exhaust gas purification catalysts in which secondary particles of an inorganic oxide are used as carrier particles are well-known to a person skilled in the art.

When exhaust gas purification is carried out using such an exhaust gas purification catalyst, the exhaust gas diffuses through the surface and pores of the carrier particles and reaches the fine particles of the catalyst metal, which is the reaction active point, and thereafter the catalyst reaction is carried out.

Patent Literature 1 describes an exhaust gas purification catalyst comprising a Pd-based composite oxide including at least one selected from alkaline earth metals. Patent Literature 1 is based on the technical idea that exhaust gas purification capability is improved by suppressing appropriately dispersing Pd on the carrier as $Pd^{2+}$, in which there are no locations in which Pd is present in a metallic state, to thereby suppress the particle growth of the Pd particles. Example 1 of Patent Literature 1 describes that $Sr_2PdO_3$ was obtained by firing strontium nitrate and palladium nitrate after contacting with malic acid.

Patent Literature 2 describes an exhaust gas purification catalyst for internal combustion engines, in which a carrier layer is included on a surface of a substrate, catalyst active ingredients containing precious metal particles are supported on the carrier, and noble metal particles are unevenly supported on or near the surface of the carrier layer through which the exhaust gas flows.

CITATION LIST

Patent Literature

[PTL 1] Japanese Unexamined Patent Publication (Kokai) No. 2005-199122
[PTL 2] Japanese Unexamined Patent Publication (Kokai) No. 2006-192365

SUMMARY

Technical Problem

Figure 2:
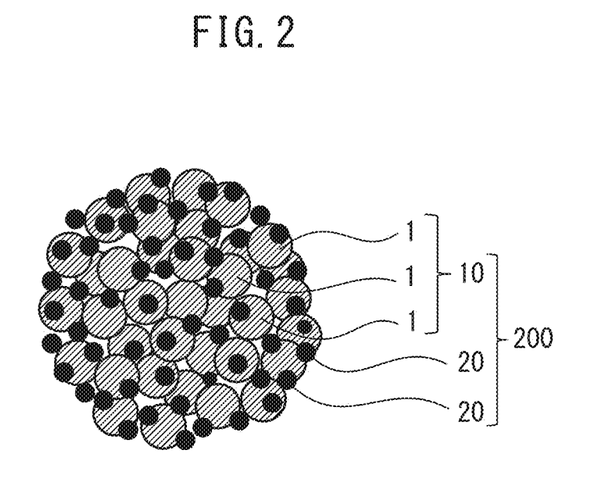
FIG. 2 is a schematic cross-sectional view detailing the structure of the exhaust gas purification catalyst of the prior art.

FIG. 2 shows a schematic cross-sectional view for detailing the structure of the exhaust gas purification catalyst of the prior art. In the exhaust gas purification catalyst (200) of FIG. 2, particles (20) of a catalyst metal are supported by secondary particles (10) formed by the agglomeration of a plurality of primary particles (1) of an inorganic oxide. The particles (20) of the catalyst metal are supported not only in the shallow region near the surface of the secondary particles (10) of the inorganic oxide, but also up to the deep region (the center part of the secondary particles (10)) inside the pores, which are cavities between the primary particles (1) constituting the secondary particles (10).

In the exhaust gas purification catalyst (200) of FIG. 2, when the supply rate of the exhaust gas is relatively low and/or early in the reaction, the exhaust gas diffuses sufficiently into the surface of the secondary particles (10) and the pores, which are the gaps between the primary particles (1) constituting the secondary particles (10), and can reach the center part of the secondary particles (10). Thus, in this case, in addition to the catalyst metal supported near the surface, the catalyst metal supported at the center part of the secondary particles (10) can also participate in the reaction, whereby the supported catalyst metal can be used efficiently.

However, when the supply rate of the exhaust gas to the exhaust gas purification catalyst (200) is high, the exhaust gas contacts the area near the surface of the secondary particles (10) but cannot diffuse and enter the pores to reach the center part of the secondary particles (10). Thus, in this case, the catalyst metal supported in the center part of the secondary particles (10) does not participate in the reaction, whereby only a part of the supported catalyst metal participates in the reaction. When the reaction progresses and the pores of the secondary particles (10) become blocked, the exhaust gas cannot enter the pores of the secondary particles (10) and reach the center part, whereby the catalyst metal in the center part cannot participate in the reaction.

Thus, in the case of an exhaust gas purification catalyst in which secondary particles of an inorganic oxide are used as the carrier particles, selective arrangement of metal fine particles near the surface of secondary particles leads to effective use of catalyst metal, which is the active point of the reaction.

The present invention aims to provide an exhaust gas purification catalyst in which particles of a catalyst metal are selectively arranged near the surface of the secondary particles of the inorganic oxide.

In order to achieve the object described above, the present invention is as follows.

<<Aspect 1>> An exhaust gas purification catalyst comprising particles of a catalyst metal supported on secondary particles of an inorganic oxide, wherein
when scanning transmission electron microscope-energy dispersive X-ray line analysis is carried out from a surface of the secondary particles toward a center thereof, a support density of the catalyst metal on a surface side of the secondary particles is greater than the support density of the catalyst metal in a center part of the secondary particles.

<<Aspect 2>> The exhaust gas purification catalyst according to <<Aspect 1>>, wherein
an average particle diameter of the secondary particles is more than 1.5 µm, and
80% or more of the catalyst metal is supported within a range of 600 nm from the surface of the secondary particles.

<<Aspect 3>> The exhaust gas purification catalyst according to <<Aspect 1>>, wherein
an average particle diameter of the secondary particles is more than 1.0 µm, and
80% or more of the catalyst metal is supported within a range of 400 nm from the surface of the secondary particles.

<<Aspect 4>> The exhaust gas purification catalyst according to any one of <<Aspect 1>> to <<Aspect 3>>, wherein the catalyst metal is one or more metals selected from platinum-group metals, copper-group metals, and iron-group metals.

<<Aspect 5>> The exhaust gas purification catalyst according to any one of <<Aspect 1>> to <<Aspect 4>>, wherein the inorganic oxide is an oxide comprising one or more selected from alumina, ceria, and zirconia.

<<Aspect 6>> An exhaust gas purification catalyst device, comprising:

a substrate and a catalyst coating layer on the substrate, wherein the catalyst coating layer comprises the exhaust gas purification catalyst according to any one of <<Aspect 1>> to <<Aspect 5>>.

<<Aspect 7>> A method for the production of the exhaust gas purification catalyst according to any one of <<Aspect 1>> to <<Aspect 5>>, comprising the steps of:

immersing carrier particles in a metal-supporting formulation coating liquid, and firing the carrier particles after immersion in the coating liquid, wherein the carrier particles are composed of secondary particles of an inorganic oxide, and the metal-supporting formulation coating liquid comprises precursor particles composed of a metal precursor and an organic compound having a mercapto group and a carboxyl group.

<<Aspect 8>> The method according to <<Aspect 7>>, wherein the organic compound is one or more selected from thioglycolic acid, thiolactic acid, 2-mercaptosuccinic acid, 2,3-dimercaptosuccinic acid, 3-mercaptopropionic acid, 3-mercaptoisobutyric acid, N-acetylcysteine, penicillamine, and thiosalicylic acid.

<<Aspect 9>> The method according to <<Aspect 7>> or <<Aspect 8>>, wherein a compounding amount of the organic compound in the metal-supporting formulation coating liquid is 1 mol to 50 mol per mol of the metal precursor.

<<Aspect 10>> The method according to any one of <<Aspect 7>> to <<Aspect 9,>>wherein the precursor particles are formed by coordinating the sulfur atoms in the mercapto groups of the organic compound with the metal atoms in the metal precursor.

<<Aspect 11>> The method according to any one of <<Aspect 7>> to <<Aspect 10>>, wherein the average particle diameter of the precursor particles, as a median diameter determined by dynamic light scattering photometry, is 0.7 nm to 10.0 nm.

ADVANTAGEOUS EFFECTS OF INVENTION

According to the present invention, there is provided an exhaust gas purification catalyst in which particles of a catalyst metal are selectively arranged near the surface of the secondary particles of the inorganic oxide.

DESCRIPTION OF EMBODIMENTS

<<Exhaust Gas Purification Catalyst>>

The exhaust gas purification catalyst of the present invention is:

an exhaust gas purification catalyst comprising particles of a catalyst metal supported on secondary particles of an inorganic oxide, wherein when scanning transmission electron microscope-energy dispersive X-ray line analysis is carried out from a surface of the secondary particles toward a center thereof, a support density of a catalyst metal on a surface side of the secondary particles is greater than the support density of the catalyst metal in a center part of the secondary particles.

Examples of preferred embodiments of the exhaust gas purification catalyst of the present invention will be described in detail below.

Figure 1:
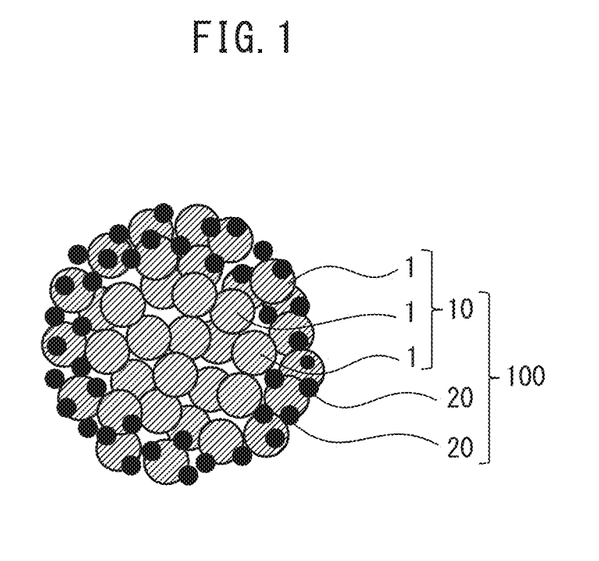
FIG. 1 is a schematic cross-sectional view detailing the structure of the exhaust gas purification catalyst of the present invention.

FIG. 1 shows a schematic cross-sectional view detailing the structure of the exhaust gas purification catalyst of the present invention.

Like the exhaust gas purification catalyst (200) of FIG. 2, the exhaust gas purification catalyst (100) shown in FIG. 1 comprises particles (20) of a catalyst metal which are supported on secondary particles (10) formed by the agglomeration of a plurality of primary particles (1) of an inorganic oxide. However, the particles (20) of the catalyst metal of the exhaust gas purification catalyst (100) of FIG. 1 are not supported in the center part of the secondary particles (10) of the inorganic oxide, but are supported only in the shallow region near the surface of the secondary particles (10).

When the supply rate of the exhaust gas is low, and/or when the pores of the secondary particles (10) become blocked, the exhaust gas can contact the area near the surface of the secondary particles (10). Thus, according to the exhaust gas purification catalyst (100) of the present invention, in which the catalyst metal is centrally supported in the shallow region near the surface of the secondary particles (10), when the supply rate of the exhaust gas is high, and when the rate of pore blockage is high, since most of the catalyst metal can participate in the reaction, there is an advantage in that activity can be stably expressed for a long period of time.

<Secondary Particles Particle Diameter and Catalyst Metal Support Depth>

In the exhaust gas purification catalyst of the present invention, the support density of the catalyst metal on the surface side of the secondary particles is greater than the support density of the catalyst metal in the center part of the secondary particles.

When producing the exhaust gas purification catalyst of the present invention, the particles diameter of the secondary particles may be, from the viewpoint of ensuring the stability and coatability of the coating liquid, for example, greater than 1.0 μm, greater than 1.5 μm, 2.0 μm or more, 2.5 μm or more, 3.0 μm or more, 4.0 μm or more, 5.0 μm or more, 10 μm or more, 15 μm or more, or 20 μm or more, and may be, for example, 200 μm or less, 150 μm or less, 100 μm or less, 80 μm or less, 60 μm or less, 50 μm or less, 40 μm or less, 30 μm or less, 20 μm or less, 15 μm or less, 10 μm or less, Sum or less, or 3 μm or less.

In the exhaust gas purification catalyst of the present invention, the support density of the catalyst metal on the surface side of the secondary particles being greater than the support density of the catalyst metal in the center part of the secondary particles can be specifically exemplified by, for example, the following two cases:

(1) An exhaust gas purification catalyst (first exhaust gas purification catalyst) in which the average particle diameter of the secondary particles is more than 1.5 μm, and 80% or more of the catalyst metal is supported within a range of 600 nm from the surface of the secondary particles, and (2) an exhaust gas purification catalyst (second exhaust gas purification catalyst) in which the average particle diameter of the secondary particles is more than 1.0 μm, and 80% or more of the catalyst metal is supported within a range of 400 nm from the surface of the secondary particles.

In the first exhaust gas purification catalyst, a sufficient difference in the support density of the catalyst metal between the surface side and the center part of the secondary particles is provided, and from the viewpoint of reliably expressing the effect of the present invention, the particle diameter of the secondary particles may be, greater than 1.5 μm, 2.0 μm or more, 5.0 μm or more, 10 μm or more, 15 μm or more, or 20 μm or more. In this case, the upper limit of the particle diameter of the secondary particles may be, for example, 200 μm or less, 150 μm or less, 100 μm or less, 80 μm or less, 60 μm or less, 50 μm or less, 40 μm or less, or 30 μm or less.

In the first exhaust gas purification catalyst, from the viewpoint of further improving the catalytic reaction activity by increasing the utilization efficiency of catalyst metal, the depth range in which 80% or more of the catalyst metal is supported may be within a depth range of 600 nm, 550 nm, 500 nm, 450 nm, or 400 nm from the surface of the secondary particles.

In the second exhaust gas purification catalyst, a sufficient difference in the support density of the catalyst metal between the surface side and the center part of the secondary particles is provided, and from the viewpoint of reliably expressing the effect of the present invention, the depth range in which 80% or more of the catalyst metal is supported may be within a depth range of 400 nm, 350 nm, 300 nm, 250 nm, or 200 nm from the surface of the secondary particles.

In the second exhaust gas purification catalyst, from the viewpoint of further improving the exhaust gas purification ability by sufficiently increasing the surface area of the secondary particles, the particle diameter of the secondary particles may be small within the range being more than 1.0 μm, and may be, for example, 50 μm or less, 40 μm or less, 30 μm or less, 20 μm or less, 15 μm or less, 10 μm or less, 5 μm or less, or 3 μm or less. In this case, the lower limit of the particle diameter of the secondary particles may be, for example, greater than 1.5 μm, 2.0 μm or more, 2.5 μm or more, or 3.0 μm or more.

In both of the first and second exhaust gas purification catalysts, from the viewpoint of efficient utilization of the catalyst metal, the proportion of catalyst metal supported within the above depth ranges from the surface of the secondary particles is 80% or more. From the viewpoint of greater utilization efficiency of the catalyst metal, the proportion of the catalyst metal supported within the above depth ranges from the surface of the secondary particles may be 85% or more, 90% or more, or 95% or more, and may be 100%.

The depth range in which the catalyst metal is supported is measured by scanning transmission electron microscope-energy dispersive X-ray (STEM-EDX) line analysis. It can also be examined by a field emission type electron beam microanalyzer (FE-EPMA).

<Secondary Particles>

In the exhaust gas purification catalyst of the present invention, secondary particles of an inorganic oxide are used as a carrier.

The inorganic oxide of the present invention may be an inorganic oxide including one or more selected from, for example, alumina ($Al_2O_3$), silica ($SiO_2$), zirconia ($ZrO_2$), titania ($TiO_2$), and rare earth element oxides. The rare earth element oxide may be, for example, lanthana ($La_2O_3$), ceria ($CeO_2$), neodymia ($Nd_2O_3$), europia ($Eu_2O_3$), or gadolinia ($Gd_2O_3$). The inorganic oxide may be an oxide including one or more selected from, for example, alumina, ceria, and zirconia, and may include, for example, alumina and a ceria-zirconia composite oxide.

The secondary particles of the inorganic oxide may be an aggregate of primary particles of the inorganic oxide.

From the viewpoints of facilitating the diffusion of gaseous reactants into the pores of the secondary particles and ensuring good handling properties, the particle diameter of the primary particles of the inorganic oxide may be, for example, 1 nm or more, 5 nm or more, 10 nm or more, 15 nm or more, or 20 nm or more, and may be, from the viewpoint of ensuring the required specific surface area as a carrier, for example, 200 nm or less, 150 nm or less, 100 nm or less, or 80 nm or less.

The particle diameter of the secondary particles is as described above.

<Particles of Catalyst Metal>

A desired catalyst metal may be selected as the metal constituting the particles of the catalyst metal, and may be a noble metal or a base metal. Specifically, it may be one or more metals selected from platinum-group metals, copper-group metals, and iron-group metals. Platinum-group metals include, for example, palladium, platinum, and rhodium. The copper-group metals include, for example, silver and copper. The base metal may be, for example, an iron-group metal, and may be selected and used from cobalt, nickel, and iron.

The supporting amount of the catalyst metal and the particle diameter of the particles of the catalyst metal may be appropriately set in accordance with the size of the exhaust gas purification catalyst device to which it is expected to be applied and the type of catalyst metal. They may be as described below.

Particle diameter of the particles of the catalyst metal: 1 nm or more, 2 nm or more, 3 nm or more, 4 nm or more, or 5 nm or more; and 20 nm or less, 15 nm or less, or 10 nm or less.

The supporting amount of the catalyst metal: 0.1 mass % or more, 0.3 mass % or more, 0.5 mass % or more, 1.0 mass % or more, 2.0 mass % or more, or 3.0 mass % or more; and 20 mass % or less, 15 mass % or less, 10 mass % or less, 8 mass % or less, 7 mass % or less, or 5 mass % or less, based on the mass of the secondary particles of the inorganic oxide.

<<Exhaust Gas Purification Catalyst Production Method>>

The exhaust gas purification catalyst of the present invention may be produced by, for example:

A method for the production of an exhaust gas purification catalyst comprising the steps of:

immersing carrier particles in a metal-supporting formulation coating liquid (immersion step), and firing the carrier particles after immersion in the coating liquid (firing step), wherein the carrier particles are composed of secondary particles of an inorganic oxide, and the formulation coating liquid comprises precursor particles composed of a metal precursor and an organic compound having a mercapto group and a carboxyl group.

<Carrier Particles>

The carrier particles are composed of secondary particles of the inorganic oxide. Regarding the exhaust gas purification catalyst of the present invention, refer to the descriptions above. The type of the inorganic oxide may be selected in accordance with the type of the carrier particles of the desired catalyst.

<Metal-Supporting Formulation Coating Liquid>

The metal-supporting formulation coating liquid used in the method for the production of the exhaust gas purification catalyst of the present invention is a liquid composition in which a metal precursor, precursor particles composed of an inorganic compound including a mercapto group and a carboxyl group, and optional components used as needed are dissolved or dispersed in an appropriate solvent.

The precursor particles included in the formulation coating liquid of the present invention may be particles which are formed by coordinating organic compound having a mercapto group and a carboxyl group with the metal precursor.

The average particle diameter of the precursor particles, as a median diameter determined by dynamic light scattering (DLS) photometry, may be, for example, 0.7 nm or more, 0.8 nm or more, 1.0 nm or more, 1.5 nm or more, 2.0 nm or more, or 1.5 nm or more, and may be, for example, 10.0 nm or less, 8.0 nm or less, 7.0 nm or less, 6.0 nm or less, 5.0 nm or less, or 4.0 nm or less.

(Metal Precursor)

The metal precursor is a compound for generating the catalyst metal supported on the secondary particles of the inorganic compound by reduction in any of the steps (for example, in the firing step described below) of the method for the production of the exhaust gas purification catalyst of the present invention.

As the metal atom in the metal precursor, a catalyst metal in a desired catalyst may be selected, and may be selected with reference to the above description of the exhaust gas purification catalyst of the present invention. The metal atom may be a noble metal or a base metal. Specifically, the noble metal may be a platinum-group metal or a copper-group metal. Examples of platinum-group metals include palladium, platinum, and rhodium. Examples of copper-group metals include silver and copper. The base metal may be, for example, an iron-group metal, and may be selected from cobalt, nickel, or iron.

The metal precursor may be a nitrate, hydroxide, halide, or complex compound containing the selected metal atoms. As the halide, chloride is preferred. Specific examples of the metal precursor are as follows for each type of metal atom.

The palladium precursor may be, for example, palladium (II) nitrate, palladium(II) chloride, palladium(II) hydroxide, dinitrodiamine palladium(II), or dichlorodiamine palladium (II). Among these, dinitrodiaminepalladium(II) and dichlorodiaminepalladium(II), which are complex compounds of palladium, may be used as a nitric acid solution in the preparation of the formulation coating liquid.

The platinum precursor may be, for example, platinum (IV) nitrate, platinum(IV) chloride, hexahydroxoplatinum (IV) acid, or dinitrodiamine platinum(II). Among these, chloroplatinic(IV) acid, hexahydroxoplatinum(IV) acid, and dinitrodiamine platinum(II), which are platinum complex compounds, may be used as a nitric acid solution in the preparation of the formulation coating liquid.

The rhodium precursor may be, for example, rhodium(III) nitrate, rhodium(III) chloride, rhodium(III) hydroxide, or hexanitrorhodium(III) acid.

The base metal precursor may be, for example, cobalt(II) nitrate, cobalt(II) chloride, cobalt(II) hydroxide, nickel(II) nitrate, nickel(II) chloride, nickel(II) hydroxide, copper(II) nitrate, copper(II) chloride, copper(II) hydroxide, iron(III) nitrate, iron(II) chloride, or iron(II) hydroxide.

From the viewpoint that anions and catalyst poisoning components in the precursor can be easily removed by washing and the amount of residue in the obtained catalyst can be reduced, among those described above, the metal precursor is preferably selected from palladium(II) hydroxide, hexahydroxo platinum(IV) acid, dinitrodiamine platinum(II) acid, rhodium(III) hydroxide, cobalt(II) hydroxide, nickel(II) hydroxide, copper(II) hydroxide, and iron(II) hydroxide.

The catalyst metal in the exhaust gas purification catalyst of the present invention may be selected from platinum-group, copper-group, and iron-group metals, and in particular, the use of a platinum-group metal is suitable.

(Organic Compound Having Mercapto Group and Carboxyl Group)

The organic compound having a mercapto group and a carboxyl group has a function of interacting with the metal precursor and carrier particles mixed in the metal-supporting formulation coating liquid in the production of the exhaust gas purification catalyst of the present invention, and retaining the metal precursor near the surface of the carrier particles. In other words, the sulfur atoms in the mercapto groups included in the organic compound coordinate with the metal atoms in the metal precursor, and it is considered that the metal precursor is retained near the surface of the carrier particles as a result of the interaction of the carboxyl group with the surface of the carrier particles. It is considered that by carrying out firing while retaining the metal precursor near the surface of the carrier particles, the particles of the catalyst metal are selectively present near the surface of the carrier particles.

In order to efficiently develop the function of retaining the metal precursor near the surface of the carrier particles by mutual interaction between both the metal precursor and the surface of the carrier particles, the organic compound having a mercapto group and a carboxyl group is preferably a compound having a comparatively low molecular weight. Specifically, the molecular weight of the organic compound having a mercapto group and a carboxyl group may be 1,000 or less or 500 or less. Conversely, due to the requirement of having both a mercapto group and a carboxyl group, the molecular weight of the organic compound may be 77 or more, 100 or more, or 120 or more.

The number of mercapto groups in the organic compound may be 1 or more, preferably 1 to 4, and more preferably 1 or 2.

The number of carboxyl groups in the organic compound may be 1 or more, preferably 1 to 4, and more preferably 1 or 2.

The organic group having a mercapto group and a carboxyl group may be, for example, thioglycolic acid, thiolactic acid, 2-mercaptosuccinic acid (also known as thiomalic acid), 2,3-dimercaptosuccinic acid, 3-mercaptopropionic acid, 3-mercaptoisobutyric acid, N-acetylcysteine, penicillamine, or thiosalicylic acid.

The organic compound having a mercapto group and a carboxyl group is more preferably thiomalic acid, 2,3-dimercaptosuccinic acid, or cysteine, and further preferably thiomalic acid or cysteine.

When the organic compound having a mercapto group and a carboxyl group has an optical isomer, it may be used in any of D-form, L-form, and racemic form.

The usage rate of the organic compound having a mercapto group and a carboxyl group may be, for example, 1 mol or more, 3 mol or more, 5 mol or more, 7 mol or more, or 10 mol or more, and may be, for example, 50 mol or less, 40 mol or less, 30 mol or less, 20 mol or less, or 15 mol or less per mol of the metal precursor mixed in the coating liquid. As long as the usage rate of the organic compound is 1 mol or more per mol of the metal precursor in the coating liquid, the function of effectively interacting with the metal precursor and carrier particles contained in the coating liquid and effectively retaining the metal precursor near the surface of the carrier particles can be effectively exhibited. Conversely, as long as the rate is 50 mol or less, in the firing step at the time of production of the catalyst, the production of firing residues derived from this organic compound can be suppressed, and a preferable exhaust gas purification ability can be exhibited.

(Optional Components)

The metal-supporting formulation coating liquid includes precursor particles composed of the metal precursor, the organic compound having a mercapto group and a carboxyl group, and a solvent described below, and may further include other optional components in accordance with need. The optional components may be, for example, pH adjusters, surfactants, and thickeners.

(Solvent)

The solvent included in the metal-supporting formulation coating liquid may be an aqueous solvent, and may be water or a mixed solvent of water and a water-soluble organic solvent. The water-soluble organic solvent may be, for example, an alcohol such as methanol, ethanol, isopropanol, or ethylene glycol; an ether such as 1,2-dimethoxyethane, tetrahydrofuran, or 1,4-dioxane; a ketone such as acetone; an ester such as ethyl acetate; or a polar solvent such as dimethylformamide.

The solvent of the metal-supporting formulation coating liquid is preferably water.

(Coordination of Sulfur Atom to Metal Atom)

It is considered that the sulfur atom in the organic compound having a mercapto group and a carboxyl group in the metal-supporting formulation coating liquid is coordinated with the metal atom in the metal precursor. Whether or not the sulfur atom is coordinated with the metal atom can be confirmed by, for example, X-ray photoelectron spectroscopy (XPS). When the sulfur atom is coordinated with the metal atom, the binding energy of S2p shifts to the low energy side. For example, the S2p binding energy of the sulfur atom in the mercapto group contained in 2-mercaptosuccinic acid is approximately 163.5 eV, but when this sulfur atom is coordinated with rhodium, it shifts to approximately 162.5 eV on the low energy side.

(Particle Diameter of Precursor Particles)

In the metal-supporting formulation coating liquid, the metal precursor may form precursor particles together with the organic compound having a mercapto group and a carboxyl group. In order to easily obtain particles of the catalyst metal having an appropriate particle diameter and to limit sedimentation of the particles to ensure the handleability of the formation liquid, the particle size of these precursor particles may be, for example, 0.1 nm or more, 0.3 nm or more, 0.5 nm or more, 1.0 nm or more, 1.5 nm or more, or 2.0 nm or more, and may be, for example, 50 nm or less, 30 nm or less, 20 nm or less, 15 nm or less, 12 nm or less, or 10 nm or less.

The particle diameter is the particle diameter (D50, median diameter) at which the cumulative volume is 50% of the total in the particle size distribution measured with a particle size distribution analyzer based on the dynamic light scattering method (DLS).

(Liquidity of Metal-Supporting Formulation Coating Liquid)

The liquidity of the metal-supporting formulation coating liquid may be appropriately set in a range in which the precursor particles composed of the metal precursor and the organic compound having a mercapto group and a carboxyl group are stably dispersed. The liquidity of the formulation coating liquid may be, for example, as a pH value, 0.0 or more, 0.5 or more, 1.0 or more, 1.5 or more, or 1.0 or more, and may be, for example, 13.0 or less, 10.0 or less, 7.0 or less, 5.0 or less, or 3.0 or less.

(Concentration of Metal-Supporting Formulation Coating Liquid)

From the demand for easily and reliably support of the catalyst metal on the carrier particles, while ensuring the uniformity of the formulation coating liquid, the concentration of the metal-supporting, as a ratio of the total mass of all components other than the solvent in the formulation coating liquid to the total mass of the formulation coating liquid, may be, for example, 0.5 mass % or more, 1 mass % or more, 2 mass % or more, or 3 mass % or more, and may be, for example 30 mass % or less, 20 mass % or less, 10 mass % or less, or 5 mass % or less.

(Preparation of Metal-Supporting Formulation Coating Liquid)

The metal-supporting formulation coating liquid may be prepared by adding the metal precursor, the organic compound having a mercapto group and a carboxyl group, and the optional components, which are used as needed, in the predetermined solvent and mixing. Addition of each of the components in the solvent may be carried out simultaneously or may be carried out sequentially.

The formulation coating liquid may be heated during mixing. In order to promote the formation of the coordination bond between the metal precursor and the organic compound having a mercapto group and a carboxyl group, it is preferable that they be mixed while heating. The heating temperature at this time may be, for example, 40° C. or higher, 50° C. or higher, or 60° C. or higher, and may be, for example, 150° C. or lower, 120° C. or lower, or 100° C. or lower. The heating time may be, for example, 30 minutes or more, 1 hour or more, 2 hours or more, or 3 hours or more, and may be, for example, 12 hours or less, 10 hours or less, 8 hours or less, or 5 hours or less.

<Immersion Step>

In the immersion step, the carrier particles are immersed in the metal-supporting formulation coating liquid.

The usage rate of the carrier particles and the formulation coating liquid in the immersion step may be appropriately set in accordance with the amount of the metal supported on the carrier particles in the desired catalyst.

The temperature of the formulation coating liquid when the carrier particles are immersed in the formulation coating liquid can be, for example 5 to 90° C., and preferably 25 to 60° C. The immersion time can be, for example, 1 minute to 6 hours, and preferably 10 minutes to 1 hour.

Thereafter, a solvent removal process may be carried out as necessary. The solvent removal step may be a method in which settling is carried out for, for example, a time of 5 minutes to 12 hours at, for example, a temperature between room temperature and about 120° C.

<Firing Step>

Next, in the firing step, the exhaust gas purification catalyst of the present invention is obtained by firing the carrier particles after immersion in the coating liquid.

In order to reduce the metal atoms of the metal precursor and sufficiently remove the organic components, the temperature of the firing step may be, for example, 400° C. or more, 450° C. or more, or 500° C. or more, and in order to avoid sintering of the particles of the catalyst metal, the temperature may be, for example, 1,500° C. or less, 1,200° C. or less, 1,000° C. or less, or 800° C. or less. The duration of firing, from the same viewpoints, may be, for example, 10 minutes or more, 30 minutes or more, 1 hour or more, or 1.5 hours or more, and may be, for example, 24 hours or less, 12 hours or less, 10 hours or less, 8 hours or less, or 5 hours or less.

The ambient atmosphere during the firing step may be any of an oxidizing atmosphere, an inert atmosphere, and a reducing atmosphere. The oxidizing atmosphere is, for example, in air. The inert atmosphere is, for example, in nitrogen or argon. The reducing atmosphere is, for example, in a mixed gas of hydrogen and an inert gas (nitrogen, argon, etc.).

<<Applications of Exhaust Gas Purification Catalyst>>

The exhaust gas purification catalyst of the present invention may be used, as a catalyst component included in a coating layer formed on a substrate, for the purification of exhaust gas.

The exhaust gas purification catalyst of the present invention can be used as an exhaust gas purification catalyst device including a coating layer comprising the exhaust gas purification catalyst of the present invention on an appropriate substrate.

The substrate on which the exhaust gas purification catalyst of the present invention is used may be a monolithic honeycomb substrate constituted by, for example, cordierite, SiC, stainless steel, or metal oxide particles.

The coating layer on the substrate includes the catalyst of the present invention, and may include other optional components as necessary. Examples of the optional components include, inorganic oxide particles, binders, alkaline metal compounds, and alkaline earth metal compounds.

The inorganic oxide particles may be, for example, a composite oxide comprising alumina, silica alumina, zeolite, titanium oxide, silica, ceria, zirconia, and rare earth elements (excluding cerium).

The binder bonds between the catalyst of the present invention, between the catalyst of the present invention and other components, and between these and the substrate surface, and has the function of imparting mechanical strength to the coating layer of exhaust gas purification catalyst device. Such a binder may be, for example, alumina sol, zirconia sol, silica sol, or titania sol.

Examples of alkaline metal compounds include potassium compounds and lithium compounds. Examples of alkaline earth metal compounds include calcium compounds, barium compounds, and strontium compounds. These may be oxides or carbonates of the exemplified metals.

In the exhaust gas purification catalyst device, the coating layer comprising the exhaust gas purification catalyst of the present invention may be formed across the entire length of the substrate or may be formed on only a part of the length of the substrate. When the coating layer is formed on only a part of the length of the substrate, another coating layer may or may not be formed on the portion of the substrate on which the coating layer comprising the catalyst of the present invention is not formed.

Furthermore, the coating layer comprising the exhaust gas purification catalyst of the present invention may be formed directly on the substrate or may be formed thereon via another coating layer. Further, another coating layer may be formed on the coating layer comprising the catalyst of the present invention.

The exhaust gas purification catalyst device of the present invention may be produced by applying, for example, a water-based slurry comprising the exhaust gas purification catalyst of the present invention and the other optional components onto the desired substrate and thereafter firing.

EXAMPLES

Preparation Example 1

(1) Preparation of Metal-Supporting Formulation Coating Liquid

An Rh support formulation coating liquid was prepared by adding 0.50 g of rhodium(III) hydroxide as a metal precursor to 50 mL of ion-exchanged water and stirring, thereafter adding DL-mercaptosuccinic acid having a mercapto group and a carboxyl group as an organic compound so that the molar ratio of metal precursor:organic compound was 1:12, and then stirring the mixture at 70° C. for 4 hours. The pH of the obtained formulation coating liquid was 2.4. The particle size (D50) of the metal precursor particles of the formulation coating liquid as determined by dynamic light scattering (DLS) photometry was 2.0 nm.

(2) X-Ray Photoelectron Spectroscopic Analysis (XPS)

Figure 3:
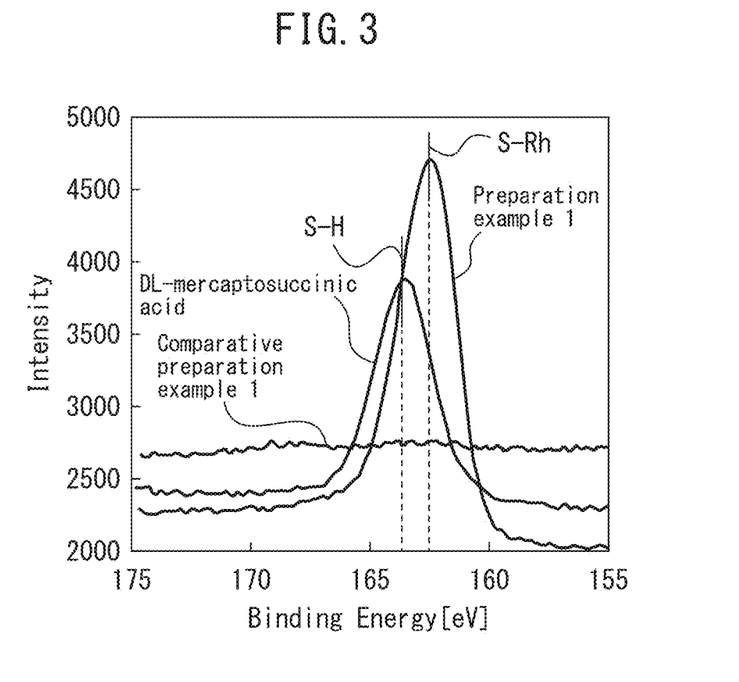
FIG. 3 is an XPS chart of metal-supporting formulation coating liquids obtained in Preparation Example 1 and Comparative Preparation Example 1, as well as DL-mercaptosuccinic acid.

Using the metal-supporting formulation coating liquid obtained above as a sample, XPS analysis was carried out under the following conditions. The obtained XPS chart is shown in FIG. 3. An XPS chart obtained using DL-mercaptosuccinic acid as a sample is also shown in FIG. 3.

Measurement Device: "PHOI5000 Versa-Probe II" produced by ULVAC-PHI, Inc.

X-rays: Monochromated Al Kα

Optical system conditions: Refer to Table 1 below

TABLE 1

| | Pass Energy [eV] | Time/Step [ms] | Cycle | Sweep | Ratio | eV Step [eV] |
|---|---|---|---|---|---|---|
| Rh3d | 117.4 | 20 | 15 | 60 | 1 | 0.25 |
| Al2p | 23.54 | 20 | 15 | 2 | 6 | 0.2 |
| S2p | 117.4 | 20 | 15 | 60 | 1 | 0.2 |

Energy Axis Correction: Al2p (74.1 eV)

Analysis Software: "Multipak" produced by ULVAC-PHI, Inc.

(3) Preparation of Metal Support Alumina Catalyst Prior to Firing

A metal (Rh) support alumina catalyst prior to firing was prepared by mixing an alumina powder (average particle diameter: 20 μm) with a metal-supporting formulation coating liquid containing 4 mass % metal atom equivalent, relative to the alumina powder, and thereafter heating and drying at 110° C. for 8 hours.

Figure 4:
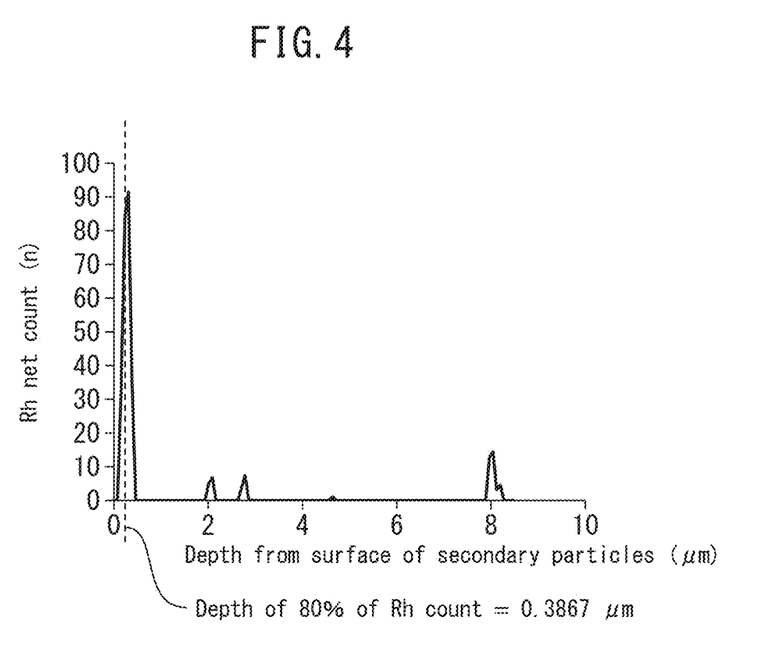
FIG. 4 is an EDS chart of a Rh support alumina catalyst obtained in Preparation Example 1 prior to firing.

(4) Scanning Transmission Electron Microscope-Energy Dispersive X-Ray (STEM-EDX) Line Analysis STEM-EDX line analysis was carried out from the surface of the secondary particles toward the centers thereof under the following conditions using the Rh support alumina catalyst obtained above as a sample. The depth at which the cumulative value of the Rh count was 80% of the total was a depth of 0.3867 μm (approximately 400 nm) from the catalyst surface. The obtained EDS chart is shown in FIG. 4.

STEM Measurement Device: "JEM-ARM200F" produced by JEOL Ltd.
Acceleration Voltage: 200 kV
EDX analyzer: "JED-2300T" produced by JEOL Ltd.
Line Analysis Range (Depth Direction): 0 to 8.5 μm Preparation Examples 2 to 9 and Comparative Preparation Examples 1 and 2

Figure 5:
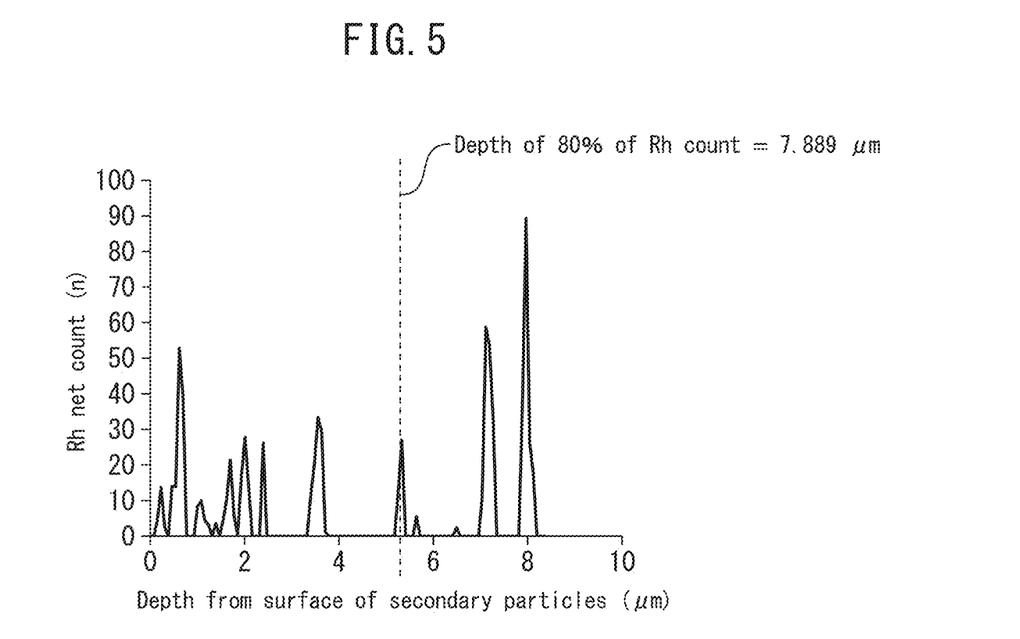
FIG. 5 is an EDS chart of a Rh support alumina catalyst obtained in Comparative Preparation Example 1 prior to firing.
Figure 6:
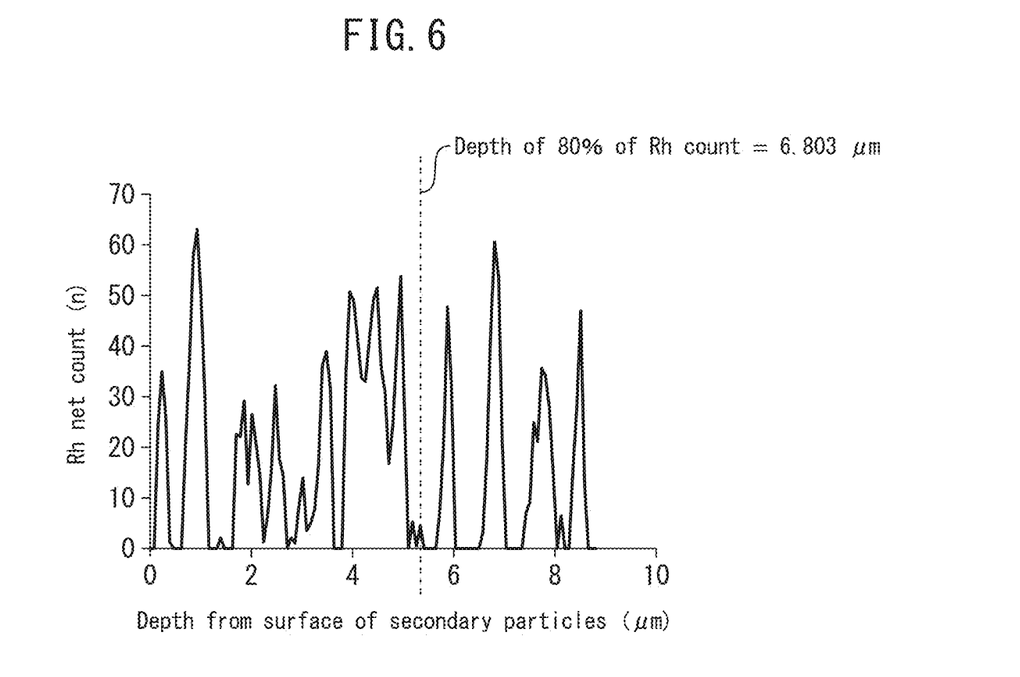
FIG. 6 is an EDS chart of a Rh support alumina catalyst obtained in Comparative Preparation Example 2 prior to firing.

Metal-supporting formulation coating liquids were prepared in the same manner as Example 1 except that the types and quantities of the metal precursor and the organic compound were as described in Table 2, metal support alumina catalysts prior to firing were prepared using these metal-supporting formulation coating liquids, and thereafter STEM-EDS analysis was carried out. The results are shown in Table 2. Furthermore, the obtained EDS charts for the metal support alumina catalysts prior to firing of Comparative Preparation Example 1 and Comparative Preparation Example 2 are shown in FIG. 5 and FIG. 6, respectively.

Figure 7:
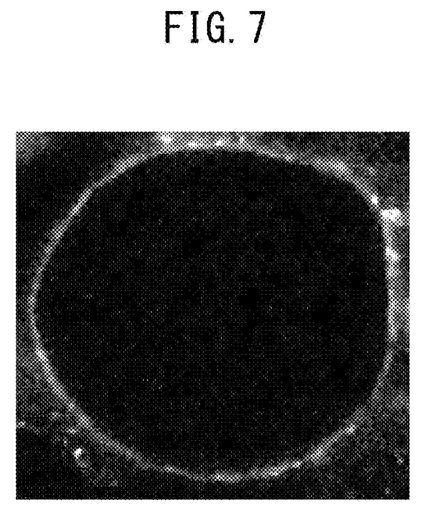
FIG. 7 is an FE-EPMA image of a Pt support alumina catalyst obtained in Preparation Example 2 prior to firing.

Regarding Preparation Example 2, field emission electron probe micro-analyzer (FE-EPMA) analysis was further carried out. The obtained FE-EPMA image is shown in FIG. 7.

Regarding Comparative Preparation Example 1, XPS analysis of the metal-supporting formulation coating liquid was further carried out. The obtained XPS chart is shown in FIG. 3.

Example 1

(5) Production of Exhaust Gas Purification Catalyst Device
(5-1) Preparation of Coating Liquid for Catalyst Coating Layer (Upper Layer) Formation 50 parts by mass of the Rh support alumina catalyst (Rh/A10) (classified to a particle diameter of 20 μm) obtained in Preparation Example 1 and 50 parts by mass of particles of a ceria-zirconia composite oxide ($CeO_2$: $ZrO_2$=1:1 (mass ratio), particle diameter 20 μm) were dispersed in ion exchange water to produce a coating liquid for catalyst coating layer (upper layer) formation.

(5-2) Formation of Catalyst Coating Layer (Lower Layer)

A catalyst coating layer (lower layer) containing 50 mass % of a Pd support alumina catalyst and 50 mass % of particles of the ceria-zirconia composite oxide ($CeO_2$: $ZrO_2$=1:1 (mass ratio)) was formed on a honeycomb substrate having a capacity of approximately 1 L. The support amount of Pd in the lower layer was 0.4 g/L-substrate in terms of Pd metal.

(5-3) Formation of Catalyst Coating Layer (Upper Layer) (Production of Exhaust Gas Purification Catalyst Device)

An exhaust gas purification catalyst device having a lower layer and an upper layer on a substrate was produced by applying the coating liquid for catalyst coating layer (upper layer) formation to the substrate having the lower layer obtained as described above and firing at 400° C. for 2 hours. The support amount of Rh in the upper layer of the exhaust gas purification catalyst device was 0.2 g/L-substrate in terms of Rh metal.

TABLE 2

| | Metal Precursor | | Organic Compound | | Formulation | Avg. Particle | Support Depth |
|---|---|---|---|---|---|---|---|
| | Type | Usage Amount (g) | Type | Usage Amount (per mol of Metal) | Coating Liquid pH | Diameter D50 | (Depth of 80% Metal Count) |
| Prep Ex 1 | $Rh(OH)_3$ | 0.50 | DL-MSA | 12 | 2.4 | 2.0 nm | 400 nm |
| Prep Ex 2 | $Pt(NH_3)_2(NO_2)_2$ | 0.50 | DL-MSA | 12 | 2.6 | 4.0 nm | 400 nm |
| Prep Ex 3 | $Co(OH)_2$ | 0.50 | DL-MSA | 12 | 2.3 | 4.3 nm | 500 nm |
| Prep Ex 4 | $Pd(OH)_2$ | 0.47 | DL-MSA | 13 | 2.4 | 3.2 nm | 400 nm |
| | $Rh(OH)_3$ | 0.03 | | (Ratio to Pd) | | | |
| Prep Ex 5 | $Fe(OH)_2$ | 0.50 | DL-MSA | 12 | 2.7 | 0.8 nm | 500 nm |
| Prep Ex 6 | $Cu(OH)_2$ | 0.50 | DL-MSA | 12 | 2.5 | 7.0 nm | 500 nm |
| Prep Ex 7 | $Ni(OH)_2$ | 0.50 | DL-MSA | 12 | 2.8 | 0.7 nm | 300 nm |
| Prep Ex 8 | $Pd(OH)_2$ | 0.50 | DL-MSA | 12 | 2.1 | 3.0 nm | 400 nm |
| Prep Ex 9 | $Rh(OH)_3$ | 0.50 | L-Cys | 12 | 6.1 | 2.7 nm | 500 nm |
| Comp Prep Ex 1 | $Rh(NO_3)_3$ | 0.50 | — | 0 | <1 | 0.7 nm | 7900 nm |
| Comp Prep Ex 2 | $Rh(OH)_3$ | 0.50 | TMAH | 24 | 14 | 4.3 nm | 6800 nm |

The names of the compounds in Table 2 have the following meanings.
(Metal Precursor)
$Rh(OH)_3$: rhodium(III) hydroxide
$Pt(NO_2)_2(NH_3)_2$: dinitrodiamine platinum(II)
$Co(OH)_2$: cobalt hydroxide(II)
$Pd(OH)_2$: palladium hydroxide(II)
$Fe(OH)_2$: iron hydroxide(II)
$Cu(OH)_2$: copper hydroxide(II)
$Ni(OH)_2$: nickel hydroxide(II)
$Rh(NO_3)_3$: rhodium nitrate(III)
(Organic Compound)
DL-MSA: DL-mercaptosuccinic acid
L-Cys: L-cysteine
TMAH: tetramethylammonium hydroxide (6) Evaluation of Exhaust Gas Purification Ability
(6-1) Durability 40-hour durability evaluations were carried out by a method in which the obtained exhaust gas purification catalyst devices were attached to the exhaust system of a V-type 8-cylinder engine, the temperature of the catalyst coating layer was set to 900° C., and the exhaust of gas in a stoichiometric atmosphere and a lean atmosphere was alternately repeated for a predetermined period of time. The circulation time of each exhaust gas was set to 8 seconds for exhaust gas in stoichiometric atmosphere and 3 seconds for exhaust gas in lean atmosphere.

(6-2) Evaluation of Exhaust Gas Purification Ability (Measurement of 50% Reaching Temperature)

After durability evaluation, the exhaust gas purification catalyst devices were attached to the exhaust system of an L4 engine to evaluate exhaust gas purification ability. Specifically, exhaust gas of SV=140,000 h$^{-1}$ and Ga=40 g/sec was supplied to the exhaust gas purification catalyst devices, and the temperature (50% reaching temperature) T50 at which the purification rates of hydrocarbon (HC), carbon monoxide (CO), and nitrogen oxide (NOx) each reached 50% was evaluated. Detailed results are shown in Table 3.

Comparative Example 1

An exhaust gas purification catalyst device was prepared in the same manner as Example 1 except that the Rh support alumina catalyst (Rh/AlO) obtained in Comparative Preparation Example 1 was used in place of the Rh support alumina catalyst obtained in Preparation Example 1. Thereafter, the exhaust gas purification ability thereof was evaluated. Detailed results are shown in Table 3.

TABLE 3

| | | 50% Reaching Temp T50 (° C.) SV = 140,000 h$^{-1}$ GA = 40 g/s | | |
|---|---|---|---|---|
| | Catalyst Type | HC | CO | NOx |
| Ex 1 | Rh/AlO of Preparation Example 1 | 355 | 346 | 346 |
| Comp Ex 1 | Rh/AlO of Comparative Preparation Example 1 | 358 | 351 | 351 |

Referring to FIG. 3, while the binding energy of the S2p orbit of the S—H bond of DL-mercaptosuccinic acid is around 163.5 eV, in the Rh support formulation coating liquid of Preparation Example 1, the binding energy of S2p shifted to approximately 162.5 eV, whereby it can be understood that the sulfur atoms coordinated with the Rh. In the formulation coating liquid of Comparative Preparation Example 1, in which an organic compound was not used, the peak of the S2p orbit is not seen.

Next, refer to Table 2 and FIGS. 4 to 6. In Comparative Preparation Example 1 (Table 2, FIG. 5), in which an organic compound was not used, and Comparative Preparation Example 2 (Table 2, FIG. 6) in which TMAH, which does not have a mercapto group, was used as the organic compound, it can be understood that an Rh support alumina catalyst in which the Rh atoms are supported deep from the surface of alumina particles was obtained. Conversely, in Preparation Example 1 (Table 2, FIG. 4), in which DL-mercaptosuccinic acid having a mercapto group and an electron-withdrawing group, was used as the organic compound, it is understood that an Rh support alumina catalyst in which 80% of the Rh atoms were supported near the surface layer of the alumina particles (in the range of about 400 nm from the surface of the secondary particles) was obtained. According to Table 2, it is understood that metal support alumina catalyst in which 80% of the metal atoms were supported within the range of 500 nm or less from the surface of alumina particles were obtained in Preparation Examples 2 to 8, in which precursor compounds of metals other than Rh were used, and Preparation Example 9, in which L-cysteine having a mercapto group and an electron-withdrawing group was used as organic compound (Table 2).

Referring to Table 3, in the exhaust gas purification catalyst device of Example 1, in which a Rh support alumina catalyst in which 80% of the Rh atoms were supported near the surface of the alumina particles was used, the 50% reaching temperature was significantly low for all of HC, CO, and NOx in a region where the space velocity of the exhaust gas SV=140,000 h$^{-1}$ was extremely high as compared to the exhaust gas purification catalyst device of Comparative Example 1, in which a Rh support alumina catalyst in which the Rh atoms were supported deep inside the alumina particles was used. This indicates that the exhaust gas purification catalyst of the present invention is extremely suitable for application to exhaust gas purification catalyst devices.

REFERENCE SIGNS LIST

1 primary particles
10 secondary particles
20 particles of catalyst metal
100, 200 exhaust gas purification catalyst

The invention claimed is:

1. An exhaust gas purification catalyst comprising particles of a catalyst metal supported on secondary particles of an inorganic oxide, wherein when scanning transmission electron microscope-energy dispersive X-ray line analysis is performed from a surface of the secondary particles toward a center thereof, a support density of the catalyst metal on a surface side of the secondary particles is greater than the support density of the catalyst metal in a center part of the secondary particles, wherein
   an average particle diameter of the secondary particles is more than 1.5 μm, and
   80% or more of the catalyst metal is supported within a range of 600 nm from the surface of the secondary particles.

2. An exhaust gas purification catalyst comprising particles of a catalyst metal supported on secondary particles of an inorganic oxide, wherein
   when scanning transmission electron microscope-energy dispersive X-ray line analysis is performed from a surface of the secondary particles toward a center thereof, a support density of the catalyst metal on a surface side of the secondary particles is greater than the support density of the catalyst metal in a center part of the secondary particles, wherein
   an average particle diameter of the secondary particles is more than 1.0 μm, and
   80% or more of the catalyst metal is supported within a range of 400 nm from the surface of the secondary particles.

3. The exhaust gas purification catalyst according to claim 1, wherein the catalyst metal is one or more metals selected from platinum-group metals, copper-group metals, and iron-group metals.

4. The exhaust gas purification catalyst according to claim 1, wherein the inorganic oxide is an oxide comprising one or more selected from alumina, ceria, and zirconia.

5. An exhaust gas purification catalyst device, comprising:
   a substrate and a catalyst coating layer on the substrate, wherein
   the catalyst coating layer comprises the exhaust gas purification catalyst according to claim 1.

6. A method for the production of the exhaust gas purification catalyst according to claim 1, comprising the steps of:
   immersing carrier particles in a metal-supporting formulation coating liquid, and
   firing the carrier particles after immersion in the coating liquid, wherein
   the carrier particles are composed of secondary particles of an inorganic oxide, the metal-supporting formulation coating liquid comprises precursor particles composed of a metal precursor and an organic compound having a mercapto group and a carboxyl group, the metal precursor is a hydroxide containing a metal atom or $Pt(NO_2)_2(NH_3)_2$, and a usage rate of the organic compound having a mercapto group and a carboxyl group is 7 mol or more and 50 mol or less per mol of the metal precursor mixed in the coating liquid.

7. The method according to claim 6, wherein the organic compound is one or more selected from thioglycolic acid, thiolactic acid, 2-mercaptosuccinic acid, 2,3-dimercaptosuccinic acid, 3-mercaptopropionic acid, 3-mercaptoisobutyric acid, N-acetylcysteine, penicillamine, and thiosalicylic acid.

8. The method according to claim 6, wherein a compounding amount of the organic compound in the metal-supporting formulation coating liquid is 10 mol to 40 mol per mol of the metal precursor.

9. The method according to claim 6, wherein the precursor particles are formed by coordinating the sulfur atoms in the mercapto groups of the organic compound with the metal atoms in the metal precursor.

10. The method according to claim 6, wherein the average particle diameter of the precursor particles, as a median diameter determined by dynamic light scattering photometry, is 0.7 nm to 10.0 nm.

11. The exhaust gas purification catalyst according to claim 2, wherein the catalyst metal is one or more metals selected from platinum-group metals, copper-group metals, and iron-group metals.

12. The exhaust gas purification catalyst according to claim 2, wherein the inorganic oxide is an oxide comprising one or more selected from alumina, ceria, and zirconia.

13. An exhaust gas purification catalyst device, comprising:

a substrate and a catalyst coating layer on the substrate, wherein the catalyst coating layer comprises the exhaust gas purification catalyst according to claim 2.

14. A method for the production of the exhaust gas purification catalyst according to claim 2, comprising the steps of:

immersing carrier particles in a metal-supporting formulation coating liquid, and firing the carrier particles after immersion in the coating liquid, wherein the carrier particles are composed of secondary particles of an inorganic oxide, and the metal-supporting formulation coating liquid comprises precursor particles composed of a metal precursor and an organic compound having a mercapto group and a carboxyl group, the metal precursor is a hydroxide containing a metal atom or $Pt(NO_2)_2(NH_3)_2$, and a usage rate of the organic compound having a mercapto group and a carboxyl group is 7 mol or more and 50 mol or less per mol of the metal precursor mixed in the coating liquid.

15. The method according to claim 14, wherein the organic compound is one or more selected from thioglycolic acid, thiolactic acid, 2-mercaptosuccinic acid, 2,3-dimercaptosuccinic acid, 3-mercaptopropionic acid, 3-mercaptoisobutyric acid, N-acetylcysteine, penicillamine, and thiosalicylic acid.

16. The method according to claim 14, wherein a compounding amount of the organic compound in the metal-supporting formulation coating liquid is 10 mol to 40 mol per mol of the metal precursor.

17. The method according to claim 14, wherein the precursor particles are formed by coordinating the sulfur atoms in the mercapto groups of the organic compound with the metal atoms in the metal precursor.

18. The method according to claim 14, wherein the average particle diameter of the precursor particles, as a median diameter determined by dynamic light scattering photometry, is 0.7 nm to 10.0 nm.

* * * * *